United States Patent [19]

Cline

[11] Patent Number: 5,064,237
[45] Date of Patent: Nov. 12, 1991

[54] HOPPER AND LINER APPARATUS

[76] Inventor: Norman D. Cline, 5155 W. Brooks Rd., St. Louis, Mich. 48880

[21] Appl. No.: 669,899

[22] Filed: Mar. 15, 1991

[51] Int. Cl.⁵ .................. B62D 33/00; B65D 25/16
[52] U.S. Cl. ..................... 296/39.1; 220/461
[58] Field of Search .............. 296/39.1, 39.2, 39.3; 220/461, 462; 105/247; 198/550.1, 540

[56] References Cited

U.S. PATENT DOCUMENTS

| | | | |
|---|---|---|---|
| 3,418,005 | 12/1968 | Allina | 296/39.1 |
| 4,186,845 | 2/1980 | Podd | 220/461 |
| 4,453,875 | 6/1984 | Johnson, Sr. | 220/461 |
| 4,801,169 | 1/1989 | Queen et al. | 296/39.1 |
| 4,893,862 | 1/1990 | Hollenbaugh, Sr. | 296/39.1 |

Primary Examiner—Robert R. Song
Attorney, Agent, or Firm—Leon Gilden

[57] ABSTRACT

An apparatus wherein a transportable cargo vehicle mounts a hopper thereon, with a liner complementarily received within the hopper to minimize corrosion of the hopper structure. An access door in the hopper is aligned with an opening in the liner. A transparent cover structure is provided, including a pneumatic chamber to overlie the hopper and liner assemblage and enhance solar heating of contents within the hopper.

5 Claims, 4 Drawing Sheets

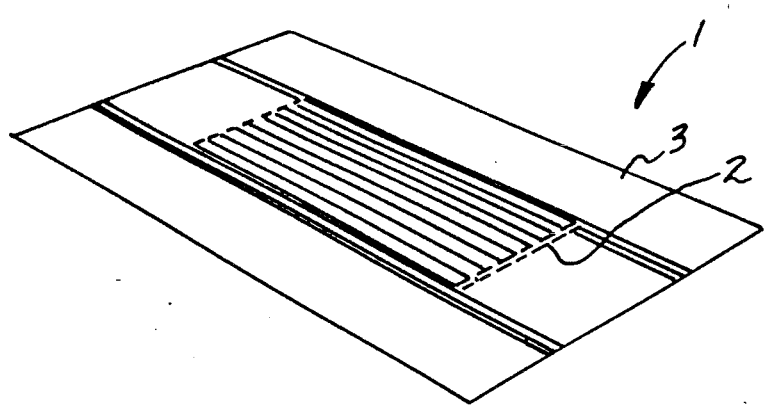
Fig 1
PRIOR ART
Fig 2
PRIOR ART
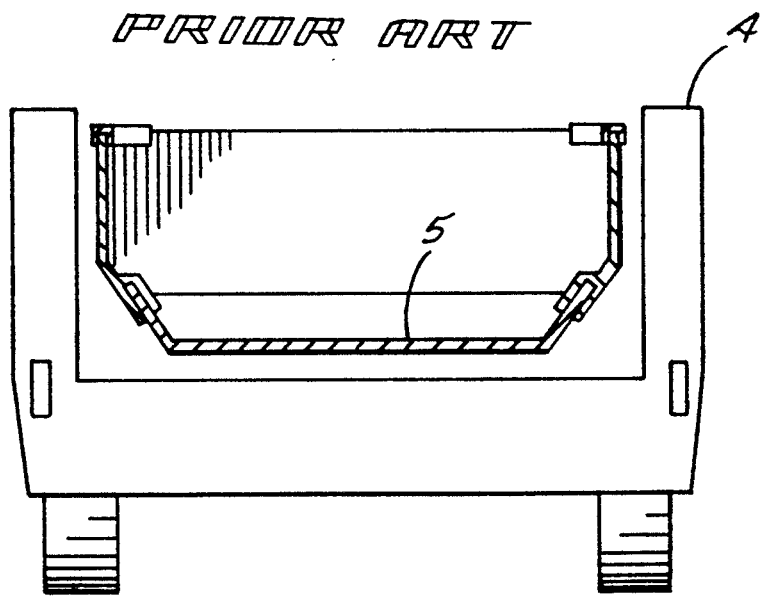

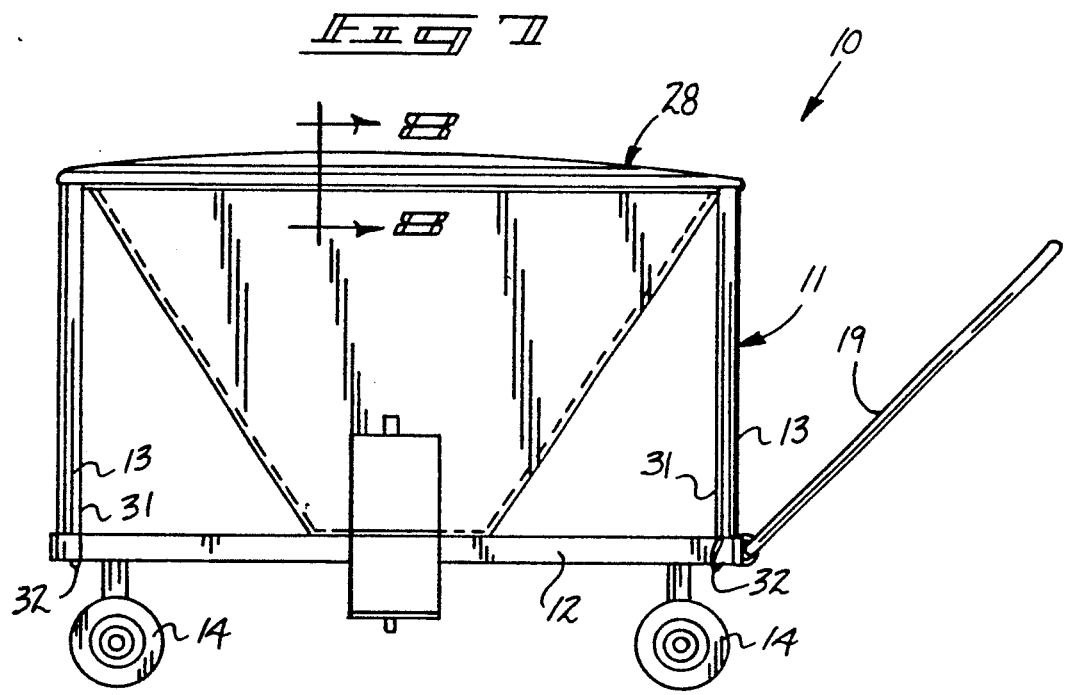
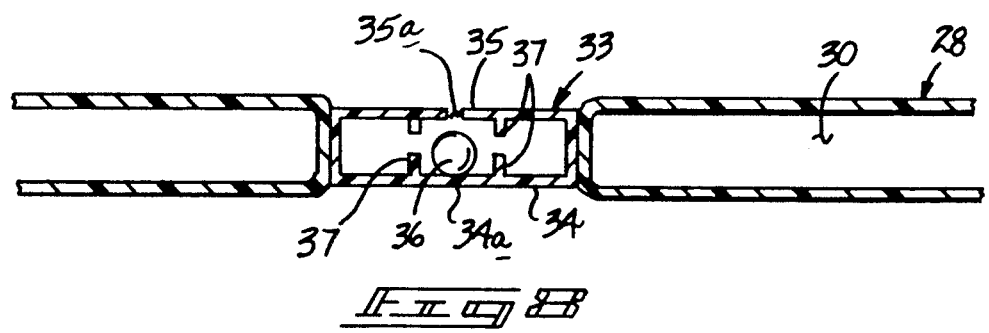
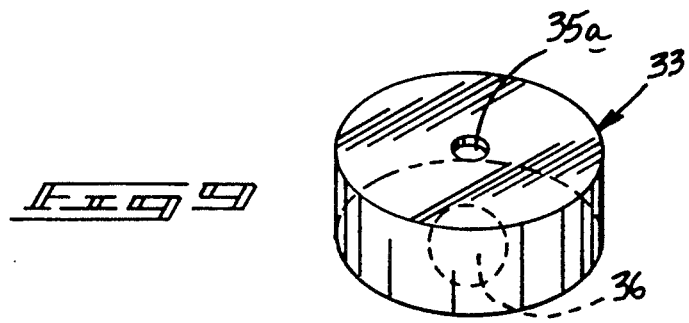

1

HOPPER AND LINER APPARATUS

BACKGROUND OF THE INVENTION

1. Field of the Invention

The field of invention relates to cargo apparatus, and more particularly pertains to a new and improved hopper and liner apparatus wherein the same provides a corrosion resistant liner apparatus removably mounted within an associated hopper structure.

2. Description of the prior Art

Transport of agricultural grains, fertilizers, and the like effects a corrosion interaction with typical hoppers that are utilized with wagons and the like in transport in an agricultural environment. Prior art apparatus providing liner structure may be found in U.S. Pat. No. 4,186,845 to Podd wherein a flexible liner structure includes a dome-like base positioned medially of a polymeric liner insertable within various containers.

U.S. Pat. No. 4,893,862 to Hollenbaugh, Sr. sets forth a cargo bed liner removably mounted within the bed structure of an associated cargo vehicle U.S. Pat. No. 4,801,169 to Queen, et al. sets forth an automotive trunk liner that is removably mounted and configured to accommodate a trunk structure of a vehicle.

U S. Pat. No. 4,673,207 to Reynolds sets forth a further example of a unitary automotive trunk liner formed of fibrous material and molded into a stiff body configuration U.S. patent 4,872,720 to Nagy sets forth a truck bed liner wherein the same is of a complementary configuration to a pickup truck vehicle bed.

As such, it may be appreciated that there continues to be a need for a new and improved hopper and liner apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known type of cargo apparatus now present in the prior art, the present invention provides a hopper and liner apparatus wherein the same sets forth in removable liner complementarily received within an associated hopper to minimize corrosive interaction of cargo components transported by the hopper. As such, the general purpose of the present invention, which will be described subsequently in greater detail, is to provide a new and improved hopper and liner apparatus which has all the advantages of the prior art cargo transport apparatus and none of the disadvantages.

To attain this, the present invention provides an apparatus wherein a transportable cargo vehicle mounts a hopper thereon, with a liner complmentarily received within the hopper to minimize corrosion of the hopper structure. An access door in the hopper is aligned with an opening in the linear. A transparent cover structure is provided, including a pneumatic chamber to overlie the hopper and liner assemblage and enhance solar heating of contents within the hopper.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the Public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hopper and liner apparatus which has all the advantages of the prior art cargo transport apparatus and none of the disadvantages It is another object of the present invention to provide a new and improved hopper and liner apparatus which may be easily and efficiently manufactured and marketed.

It is a further object of the present invention to provide a new and improved hopper and liner apparatus which is of a durable and reliable construction.

An even further object of the present invention is to provide a new and improved hopper and liner apparatus which is susceptible of a low cost of manufacture with regard to both materials and labor, and which accordingly is then susceptible to low prices of sale to the consuming public, thereby making such hopper and liner apparatus economically available to the buying public.

Still yet another object of the present invention is to provide a new and improved hopper and liner apparatus which provides in the apparatuses and methods of the prior art some of the advantages thereof, while simultaneously overcoming some of the disadvantages normally associated therewith.

Still another object of the present invention is to provide a new and improved hopper and liner apparatus wherein the liner is of a complementary configuration to the hopper removably mounted therewithin and further includes a door opening aligned with a door of the hopper structure.

These together with other objects of the invention, along with the various features of novelty which characterize the invention, are pointed out with particularity in the claim annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art container liner.

FIG. 2 is an orthographic end view, partially in section, of a further example of a prior art cargo liner structure.

FIG. 7 is an orthographic side view, taken in elevation, of the hopper, liner, and cover in an assembled configuration.

FIG. 8 is an orthographic cross-sectional configuration of the cover member, taken along the lines 8—8 of FIG. 7 in the direction indicated by the arrows.

FIG. 9 is an isometric illustration of the pressure relief valve utilized by the instant invention within the cover assembly.

DESCRIPTION OF THE PREFERRED EMBODIMENT

Figure 3:
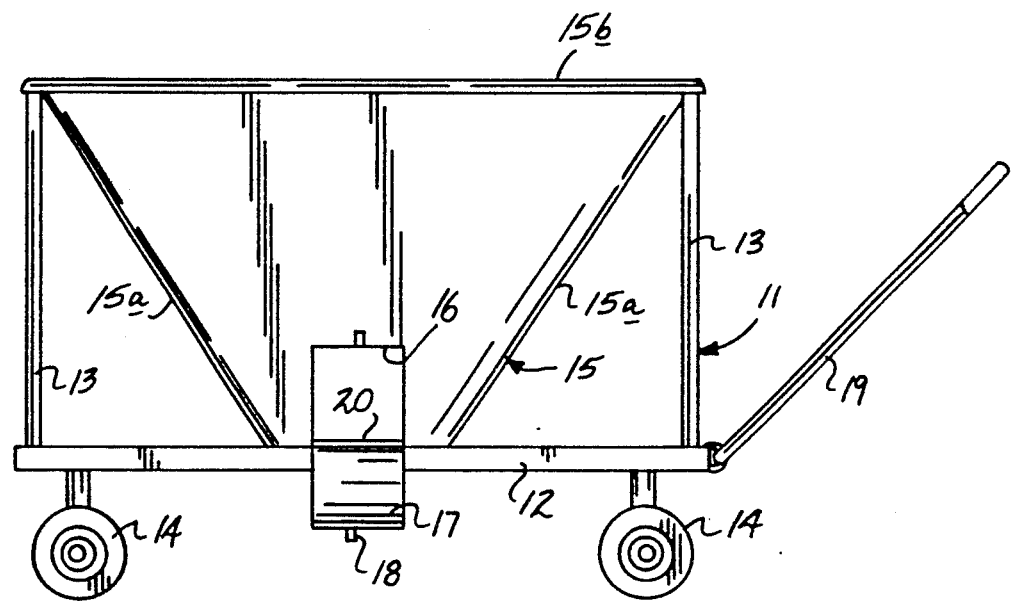
FIG. 3 is an orthographic side view, taken in elevation, of the instant invention.

With reference now to the drawings, and in particular to FIGS. 1 to 9 thereof, a new and improved hopper and liner apparatus embodying the principles and concepts of the present invention and generally designated by the reference numeral 10 will be described.

FIG. 1 illustrates a prior art liner structure 1, wherein a foam medially positioned pad 2 is mounted to a floor of a polymeric liner 3 for existing within a container, in a manner as presented in U.S. Pat. No. 4,186,845. FIG. 2 illustrates a cargo vehicle 4 mounting a polymeric liner 5 therewithin of multipart construction, in a manner as presented in U.S. Pat. No. 4,893,862.

More specifically, the hopper and liner apparatus 10 of the instant invention essentially comprises a vehicle member 11 including a rectangular, planar platform 12 mounting orthogonally thereto a support column 13 in each corner of the platform directed upwardly thereof, with a wheel member 14 positioned underlying the platform adjacent each corner of the platform. An inverted trapezoidal hopper 15 is mounted and secured to the vehicle member 11, with the hopper floor 27 (see FIG. 5) fixedly mounted to the top surface of the platform 12 and the actuate upper perimeter edge 15b of the hopper receiving the support columns 13 thereunder in an integral relationship to fixedly secure the hopper relative to the vehicle member 11. The hopper 15 includes trapezoidal downwardly sloping walls 15a, with an opening 16 directed through a forward Wall of the hopper 15 adjacent to and contiguous with the floor 27 of the hopper. An axis door 17 is pivotally mounted by way of a door hinge 20 to overlie the opening 16, with a latch 18 mounted to secure an upper edge of the door to the wall of the hopper, with the hinge coextensive with the lower terminal end of the door 17, as illustrated in FIG. 3.

Figure 4:
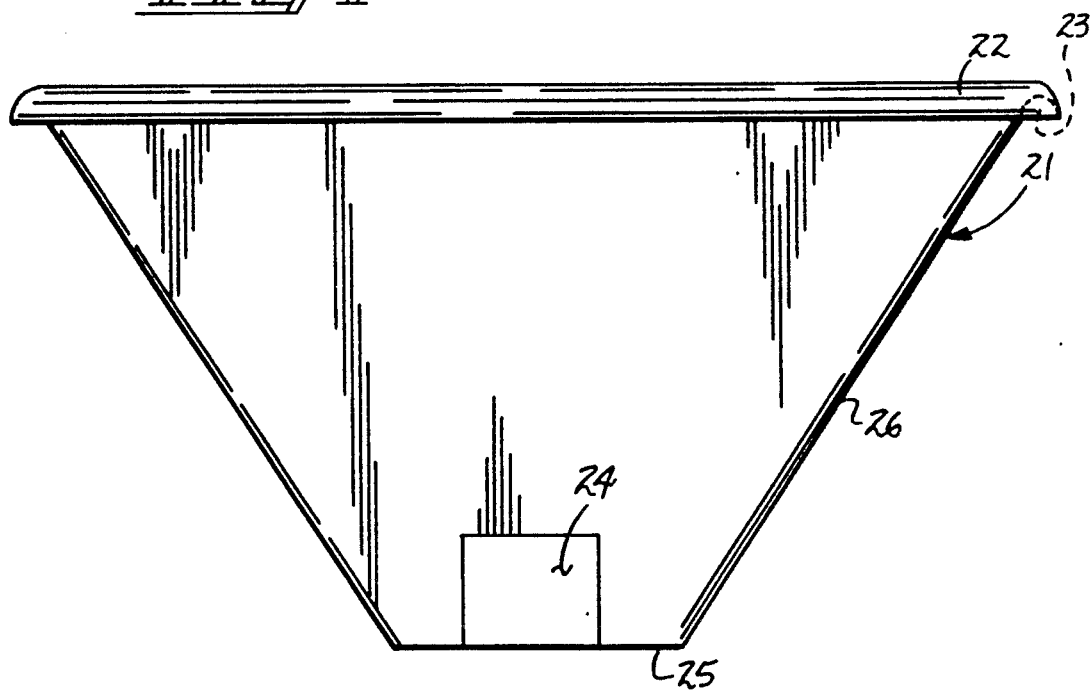
FIG. 4 is an orthographic side view, taken in elevation, of the liner utilized by the instant invention.
Figure 5:
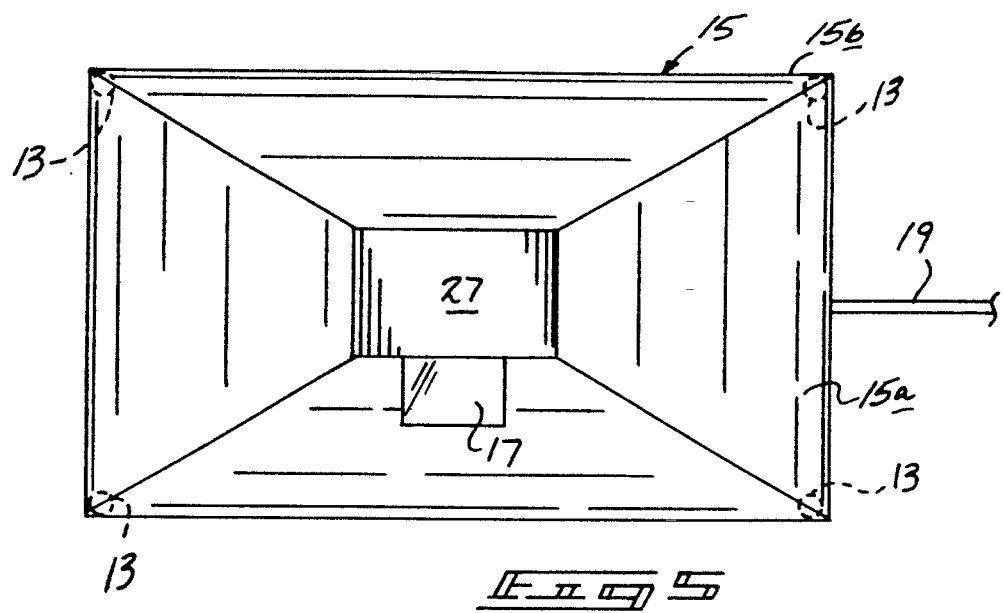
FIG. 5 is an orthographic top view of the hopper structure of the instant invention.
Figure 6:
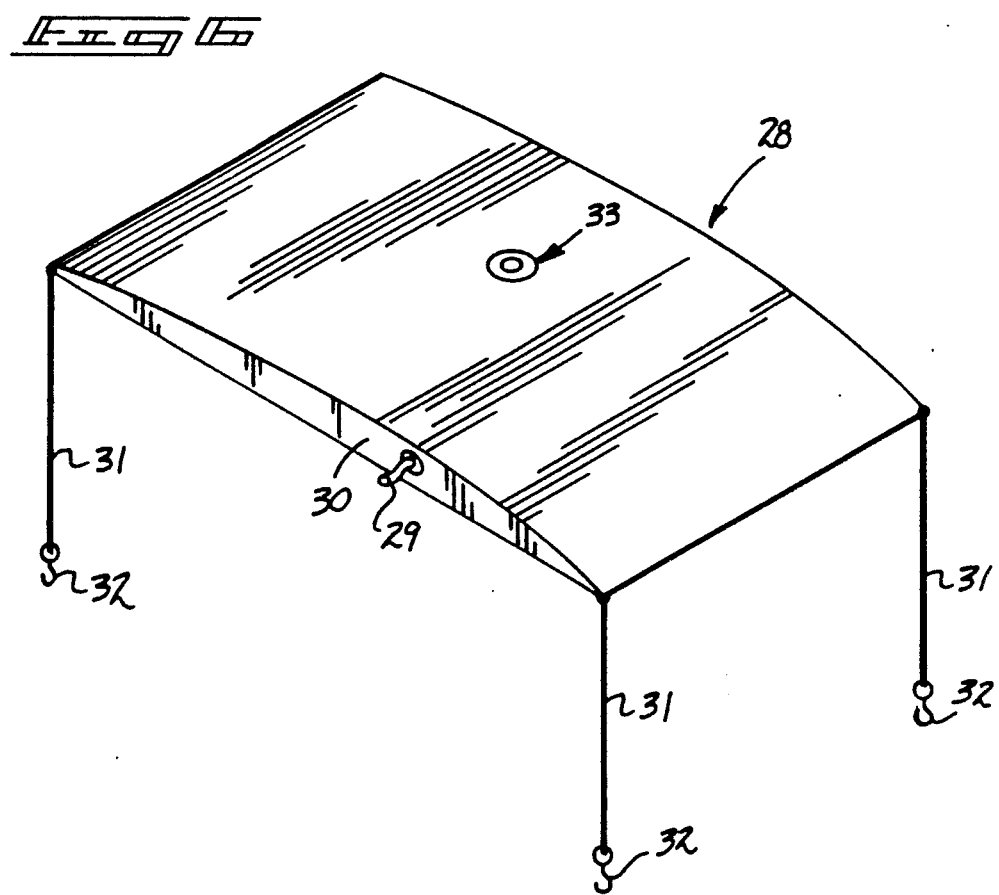
FIG. 6 is an isometric illustration of a cover member utilized by the instant invention

FIG. 4 illustrates the polymeric removable liner 21 utilized by the instant invention complementarily configured to the interior surface of the hopper 15. The liner 21 is formed with a liner upper perimeter edge 22 of a concave configuration defining a channel 23 to complementarily receive the upper terminal edge 15b of the hopper 15. A liner opening 24 is aligned with the hopper opening 16, wherein the hopper and liner are in a similar configuration. The liner floor 25 complementarily overlies the hopper floor 27 The hopper side walls 26 are also of a trapezoidal configuration complementarily configured to the side walls 15a of the hopper 15.

A transparent inflatable cover 28 is provided to overlie the hopper 15 and liner 21. The transparent characteristic of the cover permits solar heating of cargo within the liner structure 21 minimizing moisture accumulation therewithin. The cover includes an inflation valve 29 in communication with a pneumatic chamber 30 defined by the cover 28. The cover includes a convex top surface to enhance fluid drainage and precipitation directed onto the cover, with a rectangular floor of a rectangular configuration equal to an opening defined by the liner 21. The inflation valve 29 permits selective inflation of the cover 28 permitting the cover to be stored in a convenient and compact relationship during periods of non-use. Further, each corner of the cover 28 includes an elastomeric strap 31 fixedly mounted thereto, with a strap hook 32 mounted at a free end of the elastomeric straps 31 to permit securement of each hook to the platform 12 in use. The transparent pressure relief valve 33 defined as a cylindrical member is medially directed through the cover 28 through the pneumatic chamber 30. The valve 33 includes a valve floor 34, with a floor opening 34a and a roof 35 formed with a roof opening 35a, with the floor and roof openings coaxially aligned. A hollow, polymeric check ball is captured between internal webs 37 to typically position the check ball 36 over the floor opening 34a. Upon pressure build-up within the liner and hopper assemblage, the check ball is displaced relative to the floor opening 34a and pressure is vented thereby through the relief valve 33.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes Will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A hopper and liner apparatus comprising, in combination, a vehicle member, the vehicle member including a platform, the platform including a platform top surface and a platform bottom surface, the platform top surface including converted trapezoidal hopper mounted thereon, the hopper including a hopper floor fixedly mounted to the platform top surface medially of the platform top surface, with the hopper including trapezoidal hopper side walls and a trapezoidal hopper forward wall, the trapezoidal hopper forward wall including a hopper opening adjacent the platform top surface, and a hopper door overlying the hopper opening, with the hopper door pivotally mounted to the hopper forward wall to overlie the hopper opening, and the hopper further including a hopper upper perimeter edge of a generally rectangular configuration, and the hopper defining a predetermined internal configuration, and a liner defined by an external configuration equal to the predetermined configuration, with the liner including a liner opening aligned with the hopper opening, and the liner including a liner upper terminal end defining a channel, and the channel complementarily receiving the hopper upper terminal end therewithin, and the liner formed of a polymeric material.

2. An apparatus as set forth in claim 1 wherein the platform is rectangular and includes a support column integrally and orthogonally mounted to each corner of the platform top surface, with each support extending upwardly and underlying the hopper upper terminal edge.

3. An apparatus as set forth in claim 2 further including a transparent cover member defined by a rectangular configuration to overlie the hopper, and the cover member including an elastomeric strap mounted at each cover member corner, with a hook member mounted to each elastomeric strap for securement of each elastomeric strap to the platform.

4. An apparatus as set forth in claim 3 wherein the cover member includes a pneumatic chamber coextensive with the cover member, and the pneumatic chamber includes an inflation valve directed through the cover member to effect selective inflation of the cover member.

5. An apparatus as set forth in claim 4 including a transparent pressure relief valve mounted through the pneumatic chamber, the pressure relief valve including a valve floor and a valve roof, with the floor and roof arranged in a parallel relationship and the floor including a floor opening and the roof including a roof opening, with the roof and floor openings coaxially aligned relative to one another, and a check ball captured within the relief valve between the floor and the roof, the check ball positioned to normally overlie the floor opening and displaced upon excess pressure developed within the hopper underlying the cover member.

* * * * *